Nov. 6, 1934.  C. T. EVANS  1,979,965
OXYGEN CUTTING APPARATUS
Filed Dec. 7, 1932
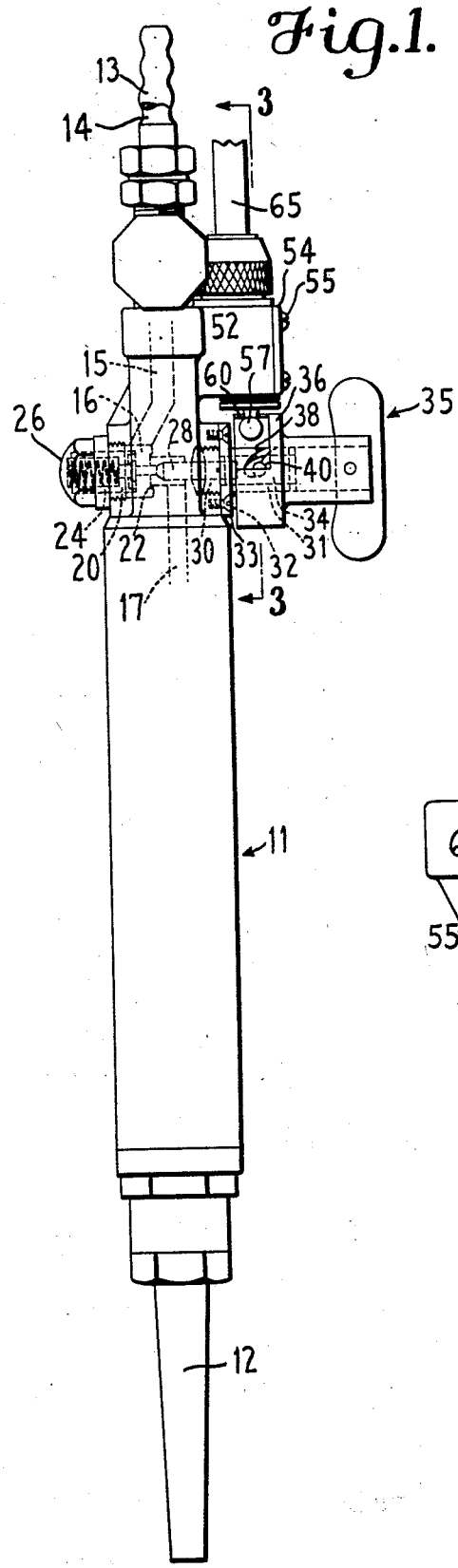
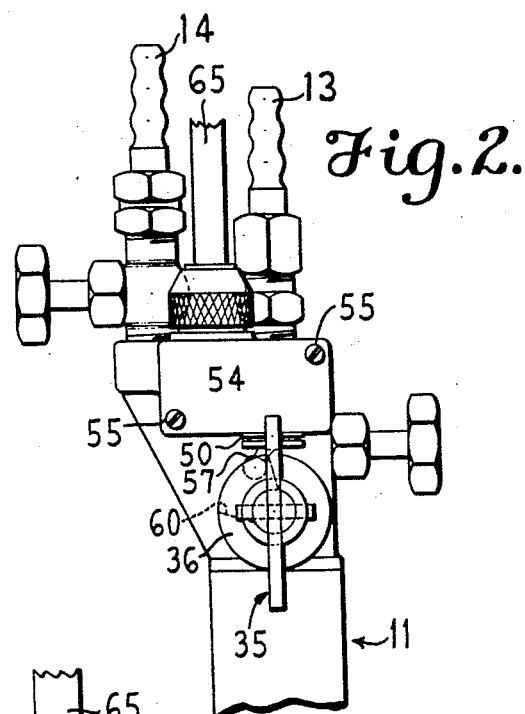
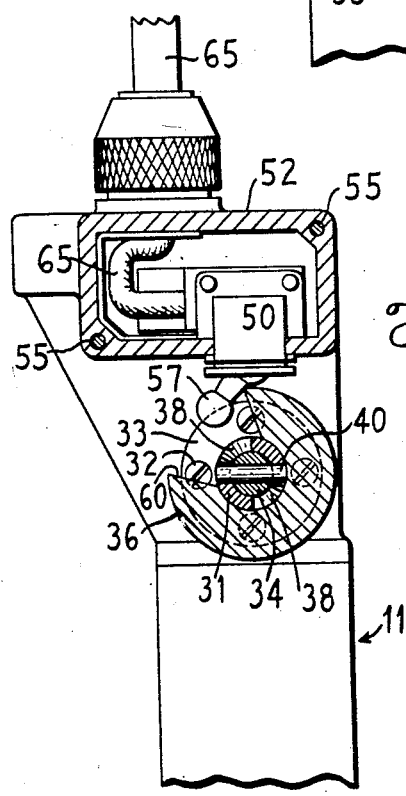
INVENTOR
Charles T. Evans
BY J. F. Brandenburg
ATTORNEY Patented Nov. 6, 1934

1,979,965

UNITED STATES PATENT OFFICE 1,979,965

OXYGEN CUTTING APPARATUS

Charles T. Evans, Jersey City, N. J., assignor to Air Reduction Company, Incorporated, New York, N. Y., a corporation of New York Application December 7, 1932, Serial No. 646,086

6 Claims. (Cl. 266—23)

This invention relates to oxygen cutting apparatus, and particularly to means for controlling the cutting jet and driving motor of a mechanical cutting machine.

Oxygen cutting machines are ordinarily equipped with electric motors which operate the torch holding mechanism and cause the torch to travel along a definite path across the work. The supply of cutting oxygen to the torch tip is controlled by a valve, and the operation of the motor is controlled by a switch. Large and heavy machines require a substantial amount of power for the motor.

It is an object of this invention to control the supply of cutting oxygen and the operation of the motor by an electric switch of a type adapted to supply the necessary power with safety, and a control valve, operated by a common handle.

Another object of this invention is to operate a snap switch from valve operating mechanism which connects with the switch through a lost-motion connection. An advantage of such a combination is that initial movement of the valve operating mechanism has no effect on the switch, but the later part of the movement causes the snap action of the switch.

Another object is to provide suitable connections for operating an electric switch from a valve operating handle which has a combined rotary and axial movement when turned to operate the valve. The invention contemplates a handle extending from the switch into the path of one or more abutments carried by the handle, such as the side walls of an axially extending slot or groove formed in a sleeve secured to the handle.

Other objects, features and advantages of the invention will appear or be pointed out as the description proceeds.

In the accompanying drawing, forming a part hereof:

Fig. 1 is a front elevation of an oxygen cutting torch with an electric control switch operated from a cutting oxygen valve handle, in accordance with this invention;

Fig. 2 is a fragmentary side elevation of the upper part of the torch shown in Fig. 1; and Fig. 3 is an enlarged fragmentary view, partly in section, showing the relation of the snap switch and valve operating handle.

An oxygen cutting torch 11 has a tip 12 at the lower end, and connections 13 and 14 at the other end for oxygen and acetylene hoses, respectively. The cutting oxygen flows from the connection 13, through a conduit 15, valve chamber 16, and conduit 17, to the torch tip.

The oxygen flow is controlled by a valve 20, which is movable in the valve chamber 16 toward and from a seat 22. A spring 24 urges the valve toward the seat, and when against the seat the valve is in closed position and stops the flow of oxygen into the conduit 17. One end of the valve chamber is closed by a back cap 26, which serves as a bearing on which the valve slides.

The valve 20 is moved into open position by a thrust rod 28, which is slidable in openings through the torch body and stuffing-box 30, which are axially aligned with the valve.

A thimble 31 is secured to the side of the torch, over the stuffing-box 30, by screws 32 which pass through a basal flange 33 of the thimble. The outer end of the rod 28 extends into the thimble, which serves as a bearing for a stem 34 of a valve operating handle 35. The handle has an outer sleeve portion 36, which fits over the outside of the thimble.

Two steep helical slots 38, cut through the wall of the thimble, have edges which constitute cam elements. A transverse pin 40 is fixed in the step of the handle so that the projecting ends of the pin coact with the cams. When the handle is turned in one direction, the cam action carries it inward, thrusting the rod 28 so that it pushes the valve 20 away from its seat and permits oxygen to flow from the valve chamber. The inner ends of the cams are formed to make rest stops. When the ends of the pin 40 are in these terminals of the cam slots, as shown in Fig. 1, the spring 24 cannot close the valve. The first turn of the handle to close the valve releases the spring so that it urges the valve and handle into closed-valve position.

A snap switch 50 is contained in a housing 52, which is integral with the torch. The side of the housing 52 is closed by a cover plate 54 secured in place by screws 55. The snap switch 50 is of conventional design, and has an operating arm 57 extending downwardly from the housing 52 and into a slot 60 which extends axially along the outer sleeve portion 36 of the valve operating handle 35.

The handle 35 turns through approximately one-quarter turn while the valve moves from open to closed position. The width of the slot 60 is such that the sides of the groove displace the switch operating arm sufficiently to cause the switch to snap into its other position just as the valve operating handle 35 reaches each end of its stroke. For example, as the valve operating handle 35 is turned in a counter-clockwise direction in Fig. 3, to open the valve, the right-hand side face of the slot 60 moves toward the switch operating arm 57, and during the latter part of the rotation of the valve handle the side face of the groove displaces the switch arm toward the left until the switch snaps the arm ino the position shown in the drawing. In this position the switch closes the circuit between conductors in a cable 65 leading to a motor for operating the cutting machine which guides the torch. Thus the oxygen valve is opened before the switch closes, and the switch remains closed until after the valve is closed. The switch therefore controls the starting and stopping of the motor so that movement of the torch over the work is timed with respect to the turning on and off of the cutting oxygen.

The first part of the movement of the handle has no effect on the switch arm because the slot 60 is of such width that considerable movement of the valve operating handle 35 is necessary to bring the wall of the groove against the switch arm 57. The switch arm 57 operated by the separated walls of the wide slot 60 constitutes a lost-motion connection between the valve operating arm and the switch. When the handle 35 is turned in a counter-clockwise direction it will open the valve before operating the snap switch. Thus, the lost-motion connection causes cutting oxygen to be supplied to the tip before the motor is started and the tip moves across the work.

The slot 60 is slightly longer than the total axial movement of the valve operating handle so that this axial movement does not affect the operation of the switch. The invention is not limited to the type of valve described and can be applied to other kinds of valves. Other changes and modifications can be made, and various features of the invention can be used alone or in combination with other features, without departing from the invention as set forth in the claims.

I claim:

1. In oxygen cutting apparatus of the class wherein a jet of cutting oxygen is directed against the work by a torch having a conduit through which the oxygen is delivered to the jet, the combination of an electrical switch having an arm, a valve for controlling the supply of cutting oxygen through said conduit, and a turning element connected with the valve, said element having separated faces alternately in sliding and pushing contact with said arm.

2. In oxygen cutting apparatus of the class having a torch with a passage for supplying cutting oxygen to a tip, the combination of a valve for controlling the flow of oxygen through the passage, a handle on the side of the torch for operating the valve, and a snap switch secured to the torch in position to be operated by the handle when moved to operate the valve.

3. Oxygen cutting apparatus, wherein a torch delivers a jet of oxygen against the work, characterized by the combination of a valve for controlling the passage of cutting oxygen through the torch, mechanism for operating the valve including a handle, and a snap switch having an arm extending into the path of an abutment carried by the valve operating mechanism so that the snap switch is operated by movement of the valve mechanism to open and close the valve.

4. In oxygen cutting apparatus of the class having a torch with a tip from which a jet of cutting oxygen is directed against the work, the combination of a valve for controlling the supply of cutting oxygen to the torch tip; an electric switch for controlling the operation of a motor; and mechanism for operating the valve and switch including a common handle, and a lost-motion connection between the handle and the switch.

5. In oxygen cutting apparatus of the class wherein a torch having a passage for the supply of cutting oxygen to a tip delivers a jet of oxygen from the tip and against the work, the combination of a valve for controlling the flow of oxygen through the passage, and a valve operating handle having a combined rotary and axial movement when shifting the valve between open and closed positions, of a slotted member secured to the valve handle with the slot parallel to the axis of the handle, an electric switch; and a switch operating arm movable in a plane at right angles to the axis of the handle, the end of said operating arm extending into the slot so that the rotary component of the handle movement operates the electric switch.

6. In cutting apparatus of the class wherein a torch, having a valve for controlling the passage of cutting oxygen, delivers a cutting oxygen jet against the work, valve operating mechanism including a handle; cam means for moving said operating mechanism axially as the handle is rotated; a snap switch having an operating arm which moves in a plane at right angles to the axis of rotation of the handle; a slotted member secured to the valve operating mechanism with the slot extending parallel to said axis of rotation, the operating arm of the switch extending into the slot so that the rotation of the slotted member, when the handle is turned to operate the valve, operates the snap switch, said slot being of greater width than the thickness of the switch operating arm which extends into the slot so that there is lost motion in the connection between the handle and the snap switch.

CHARLES T. EVANS.